(No Model.)

J. B. LATIMER.
AX.

No. 588,072. Patented Aug. 10, 1897.

Witnesses:
Fenton S. Felt
J. A. Willson

Inventor:
James B Latimer,
by H. B. Willson,
Attorney.

UNITED STATES PATENT OFFICE.

JAMES B. LATIMER, OF BROOME'S ISLAND, MARYLAND.

AX.

SPECIFICATION forming part of Letters Patent No. 588,072, dated August 10, 1897.

Application filed May 11, 1897. Serial No. 636,016. (No model.)

*To all whom it may concern:*

Be it known that I, JAMES B. LATIMER, a citizen of the United States, residing at Broome's Island, in the county of Calvert and State of Maryland, have invented certain new and useful Improvements in Axes; and I do declare the following to be a full, clear, and exact description of the invention, such as will enable others skilled in the art to which it appertains to make and use the same.

My invention relates to an ax; and the object is to provide an ax having a removable bit or blade and to provide means for simultaneously clamping the blade to the head of the ax as well as the head to the ax-helve.

With this object in view the invention consists of certain features of construction and combination of parts, which will be hereinafter fully described and claimed.

Figure 1:
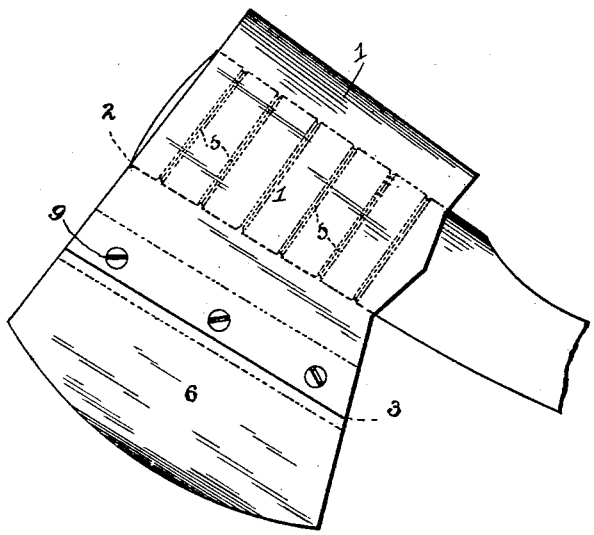
Figure 2:
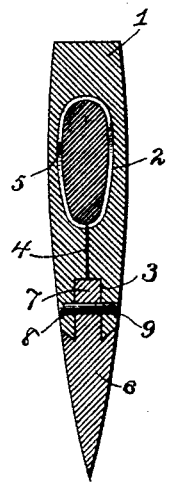

In the accompanying drawings, Figure 1 is a side view of an ax and a portion of the helve, and Fig. 2 is a transverse sectional view on the line $x\,x$ of Fig. 1.

In the drawings, 1 denotes the head of the ax, provided with an eye 2, and near its lower end with a rectangular bit-shank recess 3. The material of the head between the eye and the recess is slitted, as shown at 4, and the eye is provided with transverse corrugations 5.

6 denotes the bit or blade, which is provided with a rectangular shank 7 to fit into the recess aforesaid. A screw passes through holes 8 and 9 in the sides of the recess. One of these holes is smooth, while the other is screw-threaded. The helve is inserted in the eye of the head and the bit-shank in the recess. The screw is now inserted and will draw the separated sides of the ax firmly against the shank of the recess and will cause the walls of the eye to be embedded in the helve, thus firmly clamping the parts together.

When a blade has become worn, by removing the screw it may be taken out and a new blade inserted, and should the ax-helve break it may also be removed and replaced by a new one.

Having thus fully described my invention, what I claim, and desire to secure by Letters Patent, is—

1. An ax-head provided with an eye and with a bit-shank recess, the said head being split between the eye and the recess, and a removable blade inserted in said recess, and a screw for securing the blade in position, substantially as set forth.

2. The combination with an ax-head provided with an eye formed with corrugations and with a bit-shank recess, the said head being split between the eye and the recess, of a removable bit or blade inserted in said recess, an ax-helve inserted in said eye, and a screw for simultaneously clamping the helve and bit in position, substantially as set forth.

In testimony whereof I hereunto affix my signature in presence of two witnesses.

JAMES B. LATIMER.

Witnesses:
  WM. W. DUKE,
  JAMES T. GURDIZER.